Nov. 17, 1936.  C. W. PHILIP  2,061,043
ENGINE FUEL VAPORIZER
Filed May 4, 1936
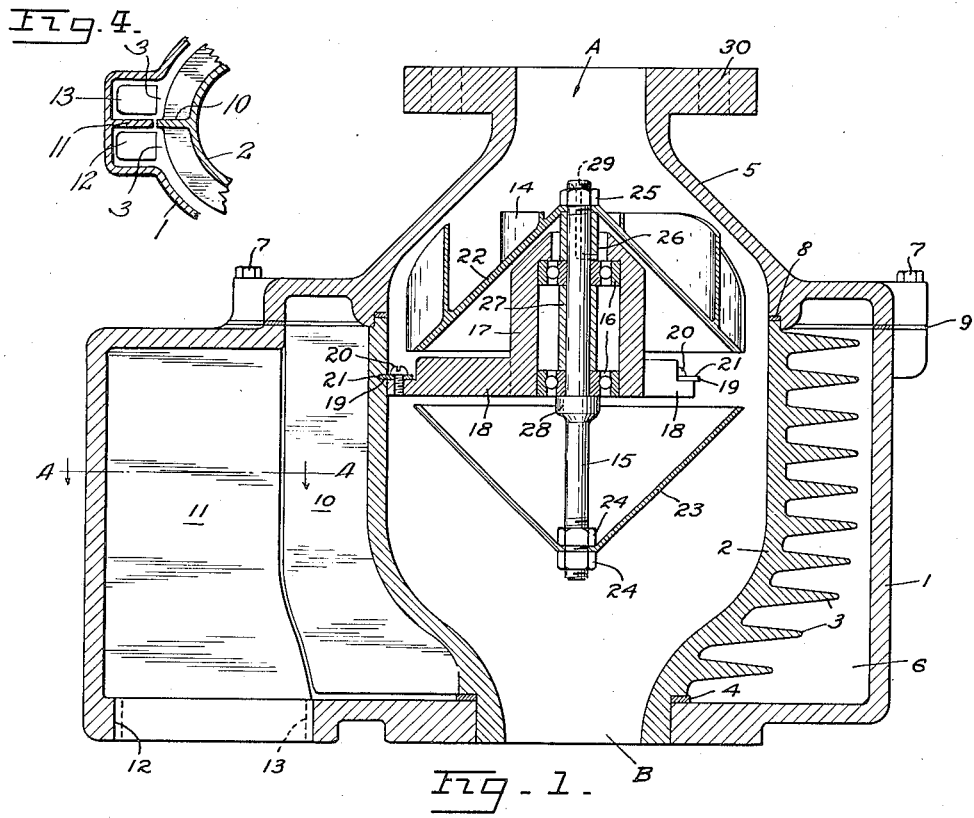
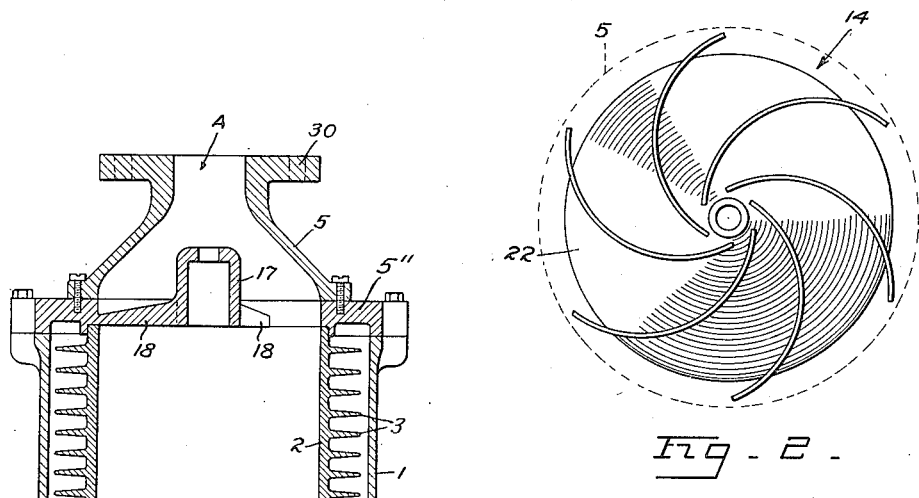
INVENTOR.
CHARLES W. PHILIP.
BY
ATTORNEY.

Patented Nov. 17, 1936

2,061,043

UNITED STATES PATENT OFFICE 2,061,043

ENGINE FUEL VAPORIZER

Charles W. Philip, Santa Rosa, Calif.

Application May 4, 1936, Serial No. 77,731

9 Claims. (Cl. 257—241)

This invention relates to devices for more effectively vaporizing hydrocarbon fuels than the ordinary carburetor used on internal combustion engines, and is a device generally to be used in connection with an ordinary carburetor, to complete the vaporization of the fuel after leaving the carburetor and before the fuel passes into the engine manifold.

The principal object of the present invention is to effect improvements in the type of vaporizer shown in my issued Patent No. 1,986,159, of January 1, 1935, and whereby even greater efficiency may be had.

Other features and advantages of the invention will appear in the following description and accompanying drawing.

In the drawing Fig. 1 is a vertical central section of my improved vaporizer.

Fig. 2 is a plan view of the spiral fan which throws the fuel particles to the side walls of the vaporizer casing.

Fig. 3 is a reduced size drawing of a modification in construction of the fan supporting structure and showing the adjacent parts of the casing, all in vertical cross section.

Fig. 4 is a reduced scale sectional view of part of Fig. 1 as taken from the line 4—4 thereof.

In further detail the vaporizer comprises a hollow casing having an inlet A at the top for more or less partially vaporized fuel, as from an ordinary carburetor, and an outlet B at the bottom, it being intended that the device be mounted in an internal combustion engine assembly so that the upper end or inlet A of the device will receive its vapors or fuel and air mixture from the carburetor and the lower end or outlet B deliver the completely vaporized product directly to the intake manifold of the engine.

In detail the vaporizer comprises an outer casing 1 forming a hot exhaust gas chamber for externally heating the vaporizer shell 2 which is spaced within the casing and provided with heat-absorbing fins 3 on its exterior, and through which shell the mixture of air and gasoline or other vaporizable fuel passes.

The shell 2 is generally cylindrical within and converges toward the outlet or lower end where it is machined to fit into an opening in the casing 1 and may have a gasket positioned at 4 under a shoulder on the shell to keep it fairly tight. The upper end of the shell 2 is covered by a cap or bonnet 5 which may extend over the exhaust gas space 6 to also close the same and is secured in place by any suitable means, such as the studs 7. The bonnet forms an inverted funnel from the inlet opening A to the vaporizer shell 2 and merges into it as shown. Gaskets may be used at points 8 and 9 if desired.

The fins 3 extend horizontally around the shell 2 and terminate against a vertical baffle wall 10 formed on one side of the shell, and in alignment with said baffle is another baffle wall 11 in the casing 1, which latter wall forms a vertical partition in the casing to separate the inlet and outlet ports 12 and 13 which are placed respectively on opposite sides of the partition 11 so that hot engine exhaust gases entering through either opening would have to circulate entirely around the shell to pass out of the other opening and thus communicate the heat to the fins and thus keep the shell heated to vaporizing temperature, it being understood that only sufficient engine exhaust gases are shunted through the heating space 6 for the purpose by the provision of suitable valve means not shown.

Within the inner shell 2 is a rotary fan 14 mounted on a vertically disposed axle 15 fitted with ball bearings 16 supported in a hub 17 provided with two or three horizontally projecting spider arms 18 in turn secured to the shell 2 by any suitable means, but here shown as by washers or small plates 19 secured to the ends of the arms by screws 20 and projecting into a slot 21 in the wall of the shell. In the drawing, Fig. 1, the washers 19 are cut away on one side so that upon loosening the screws the washers may be backed out of the slot and the spider taken out.

The fan blades or vanes are mounted on the upper outer surface of an inverted conical sheet metal body or hub 22 through the apex of which the axle 15 projects, and is secured in place by a nut 25. The blades when seen in plan as in Fig. 2 are spirally formed so as to present an increasing angle toward the periphery of the fan to the vapor being drawn over the conical wall 22 and through the blades due to suction of the engine and thus absorb to a high degree the kinetic energy of the vapors to impart a high rotative motion to the fan. Also to be observed is (see Fig. 1) that the blades or vanes are relatively deep in section, and that they conform closely to the upper conical form of the chamber for at least the major portion of their length or free edges. A sheet metal conical hub or body 23, which may be a duplicate of member 22, though without its fan blades, is mounted on the lower end of axle 15 by clamping between two nuts 24 but is reversed as compared with 22 to bring their bases in confronting relation as shown in Fig. 1 and with the upper edge of member 23 spaced just below the spider arms 18 as shown in Fig. 2.

The ball bearings 16 are combination annular and thrust type, pressed into place and properly spaced by tubular collars 26 and 27 slipped over the axles so that the bearing assembly is all forced against a shoulder 28 on the axle. The upper end of the axle is drilled as at 29 and countersunk for guiding some oily vapor or liquid to the upper bearing and from where it drips to the lower one and thence into the lower cone 23.

The arrangement of the two confronting cones 22, 23 within the shell 2 provides an annular space around their edges through which all vapors must pass close to the hot walls of the chamber, and they form a streamline obstruction or spreader centrally located in the vapor stream. It should be noted that the fan is not open between the blades for vapors to pass through, but is closed by cone 22 so that all vapors are positively forced outward, and since the lower cone also revolves, any liquid dripping into it from the bearings will at once be carried upward and outward over the conical wall and thrown outwardly by centrifugal force upon the hot wall of the chamber.

Either or both ends of the device may have a bolting flange as indicated at 30 in Fig. 1 if desired, or be provided with any desired arrangement for connecting it in an engine fuel system, and the same applies to the exhaust inlet and outlet 12 and 13.

Instead of the fan-supporting spider being secured in place as shown in Fig. 1 it may be cast integral with a head plate 5" as shown in Fig. 3 and wherein the parts already described and similarly numbered to identify them have been primed.

Due to the construction described the spiral fan reaches a high speed and since no vapor can pass through between the fan blades, all is effectively thrown against the hot walls to be more completely vaporized.

I am aware of prior vaporizers of this type being provided with suction-operated fans, but such constructions have not embraced the features above outlined, and which cooperate to increase the efficiency of such apparatus.

Having thus described my improved construction, what I claim is:

1. A vaporizer for an internal combustion engine comprising an open-ended chamber adapted for placing in an internal combustion vapor fuel line and to be heated externally by the engine exhaust, a pair of cone-shaped sheet metal members arranged within the chamber with their large ends in confronting relation, means mounting said cones for rotation, and fan blades on the exterior of one of said cones.

2. A vaporizer for an internal combustion engine comprising an open-ended chamber adapted for placing in an internal combustion vapor fuel line and to be heated externally by the engine exhaust, a pair of cone-shaped sheet metal members arranged within the chamber with their large ends in confronting relation, means mounting said cones for rotation, and fan blades arranged spirally on the exterior of one of said cones.

3. A vaporizer for an internal combustion engine comprising an open-ended chamber adapted for placing in an internal combustion vapor fuel line and to be heated externally by the engine exhaust, a pair of cone-shaped sheet metal members arranged within the chamber with their large ends in confronting relation, means mounting said cones for rotation, fan blades on the exterior of one of said cones, an axle to the opposite ends of which said cones are secured, a supporting hub through which said axle extends positioned between the cones, and spider arms from said hub extending outward between said cones supporting the hub in place.

4. In an internal combustion engine vaporizer, a chamber through which the fuel vapors are directed, a rotary fan mounted in said chamber in position across the vapor stream and formed in a manner to be revolved by said stream, said fan comprising a sheet metal substantially conical body pointed in direction of the incoming vapor stream and provided with vanes on its outer surface.

5. In an internal combustion engine vaporizer, a circular chamber through which the fuel vapors are directed, a rotary fan mounted in said chamber in position across the vapor stream and formed in a manner to be revolved by said stream, said fan comprising a sheet metal substantially conical body pointed in direction of the incoming vapor stream and provided with vanes on its outer surface, said cone being of a diameter leaving an annular gap between its outer edge and the chamber walls through which the vapors must pass.

6. In an internal combustion engine vaporizer, a circular chamber through which the fuel vapors are directed, a rotary fan mounted in said chamber in position across the vapor stream and formed in a manner to be revolved by said stream, said fan comprising a sheet metal substantially conical body pointed in direction of the incoming vapor stream and provided with vanes on its outer surface, said cone being of a diameter leaving an annular gap between its outer edge and the chamber walls through which the vapors must pass, and the vanes on the cone being spirally arranged so as to present an increasing angle toward the periphery of the fan to the vapor stream passing through.

7. In the construction specified in claim 3, ball bearings in said hub in which the axle revolves, and an oil hole leading from the end of said axle to the bearings exposed at the end of the axle to the incoming vapor fuel in a manner to cause some of the vapor to be forced thereinto.

8. In the construction specified in claim 5, the mounting of said fan including a central supporting hub provided with spider arms extending outwardly to the chamber walls and removably secured thereto.

9. In the construction specified in claim 5, the vanes of said fan being relatively deep and conforming for the major portion of their free edges to the walls of said chamber.

CHARLES W. PHILIP.